US010723900B2

(12) United States Patent
Yoo et al.

(10) Patent No.: US 10,723,900 B2
(45) Date of Patent: Jul. 28, 2020

(54) UV CURABLE INK FOR INKJET, METHOD FOR MANUFACTURING A BEZEL USING THE SAME, A BEZEL PATTERN USING THE SAME METHOD AND DISPLAY PANEL COMPRISING THE BEZEL PATTERN

(71) Applicant: LG CHEM, LTD., Seoul (KR)

(72) Inventors: Jae-Hyun Yoo, Daejeon (KR); Kook-Hyun Choi, Daejeon (KR); Joon-Hyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 102 days.

(21) Appl. No.: 14/886,809

(22) Filed: Oct. 19, 2015

(65) Prior Publication Data

US 2016/0108263 A1    Apr. 21, 2016

(30) Foreign Application Priority Data

Oct. 21, 2014 (KR) .................. 10-2014-0142813
Oct. 7, 2015 (KR) .................. 10-2015-0140722

(51) Int. Cl.
*C09D 11/324* (2014.01)
*C09D 11/101* (2014.01)
*C08K 3/04* (2006.01)

(52) U.S. Cl.
CPC .......... *C09D 11/324* (2013.01); *C09D 11/101* (2013.01); *C08K 3/04* (2013.01)

(58) Field of Classification Search
None
See application file for complete search history.

(56) References Cited

U.S. PATENT DOCUMENTS

| | | | | |
|---|---|---|---|---|
| 2008/0297041 A1* | 12/2008 | Park | .................. | H05B 33/04 313/504 |
| 2010/0302300 A1* | 12/2010 | Verdonck | .............. | B41J 2/2114 347/17 |
| 2011/0281040 A1* | 11/2011 | Ichinohe | ............... | C09K 19/12 428/1.54 |
| 2012/0111706 A1* | 5/2012 | Seckel | ................... | H01H 13/83 200/345 |
| 2013/0273315 A1* | 10/2013 | Mansky | ................... | H01B 7/00 428/138 |
| 2013/0321996 A1* | 12/2013 | Yang | ................... | B29C 45/0053 361/679.01 |
| 2014/0186592 A1* | 7/2014 | Jeon | ......................... | B32B 5/16 428/195.1 |
| 2015/0111009 A1* | 4/2015 | Choi | ....................... | G03F 7/032 428/194 |

FOREIGN PATENT DOCUMENTS

| | | | | | |
|---|---|---|---|---|---|
| JP | 2003253155 | A | 9/2003 | | |
| JP | 2006312716 | A | 11/2006 | | |
| JP | 2011231247 | A | 11/2011 | | |
| KR | 1020130132322 | | 4/2013 | | |
| WO | WO 2013179237 | A1 * | 12/2013 | .......... | G03F 7/007 |
| WO | WO 2013180386 | A1 * | 12/2013 | .......... | G03F 7/032 |

* cited by examiner

*Primary Examiner* — Shamim Ahmed
*Assistant Examiner* — Bradford M Gates
(74) *Attorney, Agent, or Firm* — Dentons US LLP

(57) ABSTRACT

Disclosed is a method of manufacturing a bezel using UV-curable inkjet ink, including: a) subjecting a substrate to inkjet printing using UV-curable inkjet ink, thus forming a substrate having a bezel; b) thermally treating the substrate having the bezel in an oven or on a hot plate, thus eliminating cure shrinkage; and c) irradiating the bezel with UV light, thus forming a cured bezel.

17 Claims, 4 Drawing Sheets

UV CURABLE INK FOR INKJET, METHOD FOR MANUFACTURING A BEZEL USING THE SAME, A BEZEL PATTERN USING THE SAME METHOD AND DISPLAY PANEL COMPRISING THE BEZEL PATTERN

CROSS REFERENCES TO RELATED APPLICATION

This application claims the benefit of Korean Patent Application Nos. KR 10-2014-0142813, filed Oct. 21, 2014 and KR 10-2015-0140722, filed Oct. 7, 2015, which are hereby incorporated by reference in their entirety into this application.

BACKGROUND OF THE INVENTION

1. Technical Field

The present invention relates to a method of manufacturing a bezel using UV-curable inkjet ink, a bezel pattern formed by the method, and a display panel including the bezel pattern.

2. Description of the Related Art

Typically, the process of forming a bezel for a touch panel has been mainly performed using screen printing. However, to obtain an optical density (OD) at a predetermined level using a screen printing process, printing of at least 2 layer is required. When the resulting bezel, having a thickness of about 10 μm, is formed on a substrate and electrodes are formed thereon, there is the likelihood of generation of opens at the boundary between the bezel and the substrate.

Thus, attempts have been made to form a bezel using an inkjet printing process. An inkjet printing process enables a desired pattern to be formed in a non-contact manner within a short time using UV curing or thermosetting, and makes it possible to achieve the desired OD of products through single patterning by adjusting the interval between inkjet drops.

At present, bezels are mostly printed on reinforced glass. When it is desired to print a bezel on a film or any substrate other than reinforced glass, a high-temperature thermosetting process, which has been conventionally used for reinforced glass, is difficult to apply, and thus the bezel must be formed using a UV curing process.

However, when printing using UV-curable ink and then curing are performed, cure shrinkage may occur. Such cure shrinkage may roughen the surface of the bezel and may also drastically deteriorate surface hardness and adhesion, undesirably resulting in poor product performance.

CITATION LIST

KR 2013-0132322 A
JP 5488175 B2

SUMMARY OF THE INVENTION

Accordingly, the present invention has been made keeping in mind the problems encountered in the related art, and an object of the present invention is to provide a method of manufacturing a bezel using UV-curable inkjet ink, in which cure shrinkage may be prevented from occurring upon curing after printing using UV-curable ink.

In order to accomplish the above object, the present invention provides a method of manufacturing a bezel using UV-curable inkjet ink, comprising: a) subjecting a substrate to inkjet printing using UV-curable inkjet ink, thus forming a substrate having a bezel; b) thermally treating the substrate having the bezel in an oven or on a hot plate, thus eliminating cure shrinkage; and c) irradiating the bezel with UV light, thus forming a cured bezel.

In order to accomplish the above object, the present invention provides a UV-curable ink composition for inkjet printing, comprising a pigment dispersion, an adhesion promoter, a binder solution, a multifunctional monomer, and a photoinitiator.

In addition, the present invention provides a bezel pattern for a display panel, manufactured by the above method.

In addition, the present invention provides a display panel, including the bezel pattern.

According to the present invention, when a bezel is manufactured using UV-curable inkjet ink, it is possible to suppress cure shrinkage that occurs upon curing immediately after printing using UV-curable ink, whereby the resultant bezel can exhibit required bezel performance, including an optical density of 4 or more, a surface hardness of 4H or more, and an adhesion of 5B.

DESCRIPTION OF THE SPECIFIC EMBODIMENTS

Figure 1:
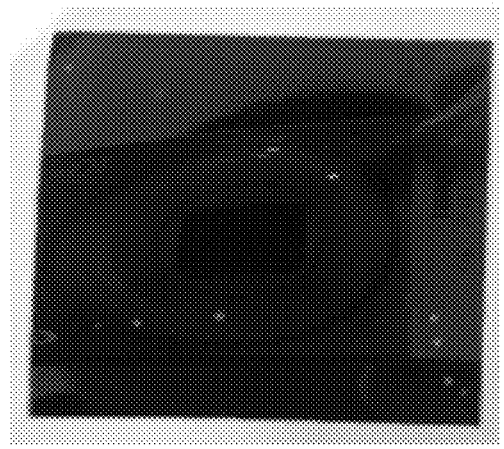
FIG. 1 illustrates a bezel obtained in Example 1.
Figure 2:
FIG. 2 illustrates a bezel obtained in Example 2.
Figure 3:
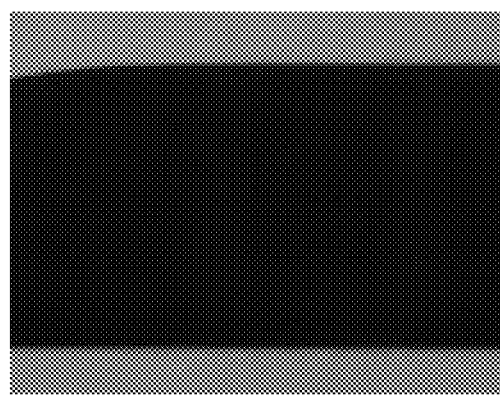
FIG. 3 illustrates a bezel obtained in Example 3.
Figure 4:
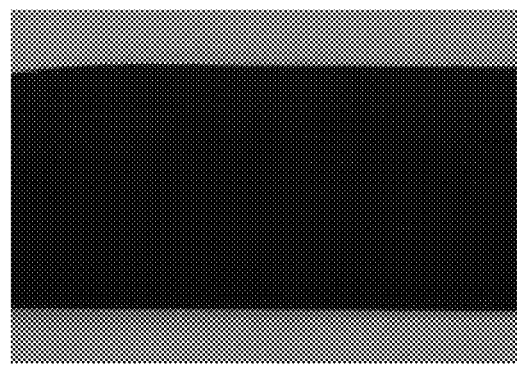
FIG. 4 illustrates a bezel obtained in Example 4.
Figure 5:
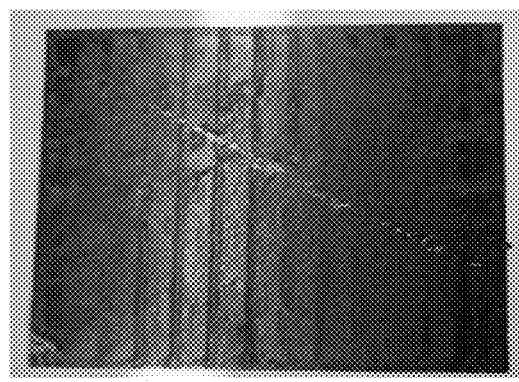
FIG. 5 illustrates a bezel obtained in Comparative Example 1.
Figure 6:
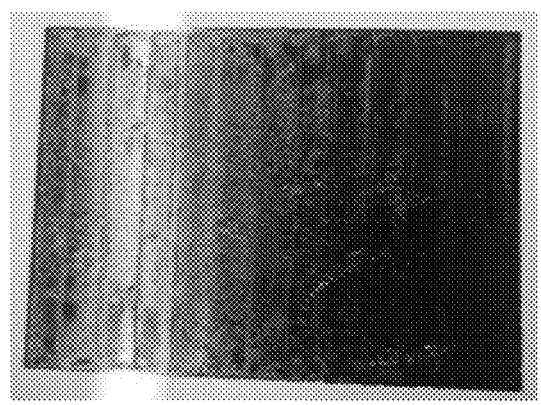
FIG. 6 illustrates a bezel obtained in Comparative Example 2.
Figure 7:
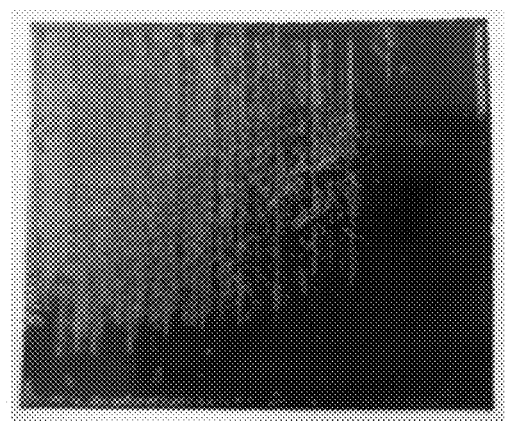
FIG. 7 illustrates a bezel obtained in Comparative Example 3.
Figure 8:
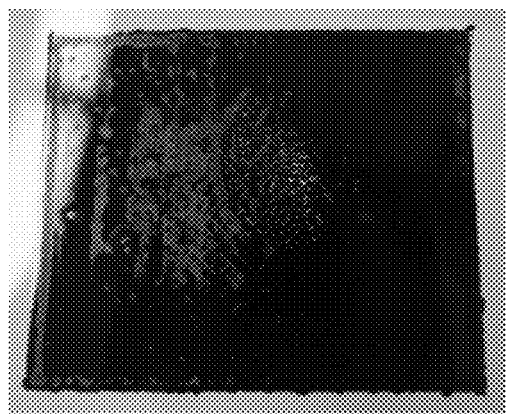
FIG. 8 illustrates a bezel obtained in Comparative Example 4.
Figure 9:
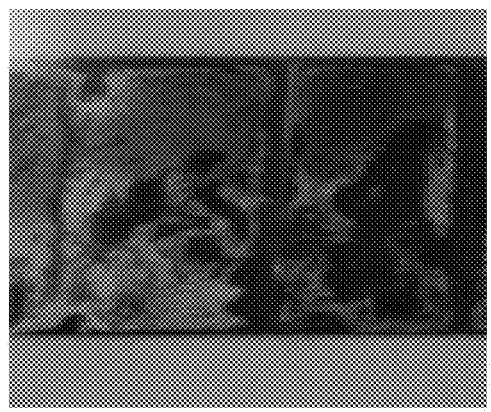
FIG. 9 illustrates a bezel obtained in Comparative Example 5.
Figure 10:
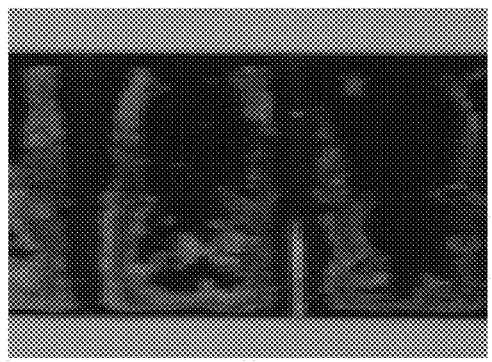
FIG. 10 illustrates a bezel obtained in Comparative Example 6.
Figure 11:
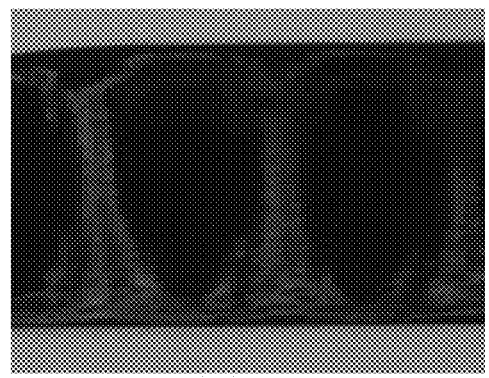
FIG. 11 illustrates a bezel obtained in Comparative Example 7.

Hereinafter, a detailed description will be given of the present invention.

According to the present invention, a method of manufacturing a bezel includes a) subjecting a substrate to inkjet printing using UV-curable inkjet ink, thus forming a substrate having a bezel; b) thermally treating the substrate having the bezel in an oven or on a hot plate, thus eliminating cure shrinkage; and c) irradiating the bezel with UV light, thus forming the cured bezel.

The substrate may include, for example, glass, a film, paper, plastic, etc.

When curing is performed immediately after printing of the substrate with UV-curable ink, cure shrinkage may occur. Such cure shrinkage may roughen the surface of the bezel and may also drastically deteriorate surface hardness and adhesion, which are required for the bezel.

Hence, the method of manufacturing the bezel according to the present invention includes suppressing cure shrinkage through thermal treatment, after inkjet printing.

Inkjet printing, which is a non-contact patterning process, enables tens of μm sized drops to be formed at desired positions to manufacture a pattern, and is advantageous because ink consumption is low and the number of processes may be drastically reduced, unlike other printing techniques.

Thermal treatment may be performed in an oven or on a hot plate.

When thermal treatment is carried out in an oven, UV-curable inkjet ink is thermally treated at 90 to 110° C. for 120 to 180 sec in an oven before the curing process, thus eliminating cure shrinkage, thereby attaining superior bezel performance.

When thermal treatment in an oven is carried out at 80° C. or less, a long period of time, at least 300 sec, is required in order to prevent cure shrinkage. On the other hand, when thermal treatment in an oven is performed at 120° C. or higher, printing quality may deteriorate due to the overflow of ink.

Also, when thermal treatment is performed on a hot plate, the hot plate process may entail heat loss, undesirably requiring a relatively long thermal treatment time compared to the oven process. The UV-curable inkjet ink is subjected to thermal treatment on a hot plate under conditions of 100 to 120° C. and 5 to 10 min before the curing process, thus eliminating cure shrinkage, thereby exhibiting superior bezel performance. If the temperature of the hot-plate thermal treatment is higher than 120° C., the substrate, i.e. the film, may be damaged. In contrast, if the temperature thereof is lower than 100° C., a long period of time is required to perform thermal treatment.

In c), the cured bezel has a thickness of 1 to 8 μm, and more particularly 2 to 6 μm, as necessary. As such, when a transparent electrode is formed on the bezel, the difference in thickness between the bezel and the cover window and the taper angle may be decreased, desirably preventing opens from occurring in the electrode pattern.

The optical density of the cured bezel is 4 to 6, and more particularly 4 to 5, as necessary. As such, superior barrier properties are exhibited thanks to the bezel pattern. If the optical density thereof exceeds 6, UV curing sensitivity may decrease. In order to achieve the optical density in the above range, the light shielding material has to be added in an increased amount, making it difficult to form the pattern.

Also, the cured bezel may exhibit a surface hardness of 4H or more and an adhesion of 5B, which are required for bezel performance.

In the present invention, the bezel refers to a pattern formed at the edge of any device, such as a watch, a display device, etc.

In the present invention, the UV-curable inkjet ink is a UV-curable ink composition comprising a pigment dispersion, an adhesion promoter, a binder solution, a multifunctional monomer, and a photoinitiator.

The pigment dispersion includes a carbon black pigment, a dispersant, and a first reactive monomer.

In the ink composition according to the present invention, the carbon black pigment may include one or more pigments or mixtures thereof, as known in the art.

The carbon black pigment is used in an amount of 10 to 30 wt % based on the total weight of the pigment dispersion. Also, the amount thereof may be set to 5 to 40 wt % based on the total weight of the ink composition.

The dispersant may include a polymeric dispersant, a nonionic dispersant, an anionic dispersant, or a cationic dispersant, and examples thereof may include polyalkylene glycol and esters thereof, polyoxyalkylene polyhydric alcohol, ester alkylene oxide adducts, alcohol alkylene oxide adducts, sulfonic acid ester, sulfonate, carboxylic acid ester, carboxylate, alkylamide alkylene oxide adducts, and alkylamine, which may be used alone or in combinations of two or more.

The dispersant is used in an amount of 2 to 6 wt % based on the total weight of the pigment dispersion.

The first reactive monomer may include those typically used in UV-curable ink compositions, and preferably has, for example, two or three functional groups. In the present invention, 1,6-hexanediol diacrylate, neopentylglycol hydroxypivalate (HPNDA), trimethylolpropane triacrylate (TMPTA), pentaerythritol triacrylate, trimethylenepropane triacrylate, pentaerythritol triacrylate, trimethylene propyl triacrylate, and propoxylated glycerol triacrylate are preferably used alone or in combination.

The amount of the first reactive monomer may be 65 to 85 wt % based on the total weight of the pigment dispersion.

The pigment dispersion is used in an amount of 50 to 65 wt % based on the total weight of the ink composition.

The adhesion promoter may be exemplified by a monofunctional monomer for enhancing adhesion.

The adhesion promoter may include at least one monomer selected from the group consisting of 2-hydroxyethyl acrylate (2-HEA), hydroxypropyl acrylate (HPA), 2-hydroxyethyl methacrylate (2-HEMA), and hydroxypropyl methacrylate (HPMA). Preferably useful is a 2-hydroxyethyl acrylate (2-HEA) monomer.

The adhesion promoter is used in an amount of 5 to 25 wt %, and preferably 10 to 15 wt % based on the total weight of the ink composition.

The binder solution includes an epoxy resin and a second reactive monomer.

The epoxy resin may be used without any limitation, as long as it can adjust the adhesion and surface hardness of the substrate and the printed layer. The epoxy resin is used in an amount of 10 to 40 wt % based on the total weight of the binder solution.

The second reactive monomer may be exemplified by an acrylate monomer.

The second reactive monomer may comprises any one or a mixture of two or more selected from the group consisting of acrylate monomers, including hydroxyethyl acrylate (HEA), hydroxyethyl methacrylate (HEMA), hexanediol diacrylate (HDDA), neopentylglycol hydroxypivalate (HPNDA) and tripropyleneglycol diacrylate (TPGDA).

The acrylate monomer is used in an amount of 60 to 90 wt % based on the total weight of the binder solution.

The binder solution is used in an amount of 5 to 20 wt % based on the total weight of the ink composition.

In the binder solution, the weight ratio of the epoxy resin: the second reactive monomer may be 20:80 to 30:70 based on the total weight of the ink composition.

The multifunctional monomer preferably has four to six functional groups, and examples of the functional groups may include, but are not limited to, acrylate, carboxyl, etc. Preferably, the multifunctional monomer may comprises, but are not limited to, at least one of dipentaerythritol hexaacrylate (DPHA) and dipentaerythritol pentaacrylate (DPPA).

The multifunctional monomer is preferably used in an amount of 1 to 20 wt % based on the total weight of the ink composition.

The photoinitiator is preferably used in an amount of 0.1 to 10 wt % based on the total weight of the ink composition.

In the ink composition according to the present invention, an additive, such as a polymerization inhibitor, a surfactant, etc., may be further used in the remaining amount.

The UV-curable ink composition may spread within a short time immediately after inkjet printing, thus exhibiting superior coating properties and high adhesion characteristics after curing. Therefore, when the UV-curable ink composition is applied, a UV lamp is preferably provided directly after an inkjet head so that curing is performed simultaneously with inkjet printing.

The UV-curable ink composition has a cure dose of 1 to 20,000 mJ/cm$^2$, and preferably 1,000 to 10,000 mJ/cm$^2$.

The UV-curable ink composition absorbs UV light at a wavelength ranging from 360 to 410 nm and is thus cured.

The UV-curable ink composition has a viscosity of, for example, 1 to 50 cP at 25° C., and preferably 2 to 20 cP at a processing temperature, and is thus suitable for use in an inkjet printing process.

The UV-curable ink composition has superior adhesion to the substrate and high coatability.

The light source for curing the UV-curable ink composition may include, for example, but is not necessarily limited to, a mercury vapor arc, a carbon arc, a Xe arc, and an LED curing machine, which may radiate light at a wavelength ranging from 250 to 450 nm.

The present invention addresses a bezel pattern for a display panel, manufactured by the above method. In the present invention, the bezel pattern refers to a pattern formed at the edge of any device, such as a watch, a display device, etc.

A bezel manufactured by the method of the present invention may have an optical density (OD) of 4 to 6, and as necessary, 4 to 5. The bezel according to the present invention may exhibit superior barrier properties thanks to the bezel pattern because it has an optical density in the above range.

Also, the bezel, manufactured by the method of the present invention using the UV-curable ink composition, may exhibit a surface hardness of 5H or more and an adhesion of 5B, which are required for bezel performance.

In addition, the present invention addresses a display panel that includes the bezel pattern.

The display may be used for any one selected from among a plasma display panel (PDP), a light emitting diode (LED), an organic light emitting diode (OLED), a liquid crystal display (LCD), a thin film transistor-liquid crystal display (TFT-LCD), and a cathode ray tube (CRT).

A better understanding of the present invention may be obtained through the following examples, which are set forth to illustrate, but are not to be construed to limit the present invention, without departing from the scope and spirit of the invention as disclosed in the accompanying claims.

<Preparation of UV-Curable Ink Composition>

Based on the total weight of the ink composition, 60 wt % of a pigment dispersion (20 wt % of carbon black, 4 wt % of a dispersant, and 76 wt % of TMPTA), 15 wt % of 2-hydroxyethyl acrylate as an adhesion promoter, 2 wt % of epoxy PD7610, 5.9 wt % of second reactive monomer HPNDA, 10 wt % of a multifunctional monomer DPHA, a photoinitiator comprising 5 wt % of Irgacure 907 and 2 wt % of ITX, and 0.05 wt % of a polymerization inhibitor MEHQ (monomethylether hydroquinone) and 0.05 wt % of surfactant byk-307 were mixed and stirred for 6 hr, yielding a UV-curable ink composition.

Example 1

The composition thus obtained was applied through inkjet printing on a cleaned LCD glass substrate so as to attain a thickness of 5 μm after curing. Subsequently, the substrate was placed in an oven, thermally treated at 100° C. for 120 sec, and irradiated with UV light and thus cured, thereby manufacturing a bezel. Upon irradiation with UV light, using a UV-LED lamp at a wavelength of 395 nm, photo-exposure was repeated under conditions of an intensity of 4,000 mW/cm based on UVV and a light dose of 2,000 mJ/cm$^2$ for each exposure, until curing was completed. The intensity of the UV lamp was measured at a position 10 mm away from the UV-LED lamp using a Power Puck II, made by EIT. In order to check whether the bezel pattern was cured after irradiation, the bezel pattern was observed for indentations and tackiness by being pressed by an observer wearing latex gloves.

Example 2

A bezel was manufactured in the same manner as in Example 1, with the exception that thermal treatment was performed at 100° C. for 180 sec, after inkjet printing and before UV curing.

Example 3

A bezel was manufactured in the same manner as in Example 1, with the exception that the substrate was placed on a hot plate and thermally treated at 100° C. for 10 min, after inkjet printing and before UV curing.

Example 4

A bezel was manufactured in the same manner as in Example 3, with the exception that the substrate was placed on a hot plate and thermally treated at 120° C. for 5 min, after inkjet printing and before UV curing.

Comparative Example 1

A bezel was manufactured in the same manner as in Example 1, with the exception that thermal treatment was not performed between inkjet printing and UV curing.

Comparative Example 2

A bezel was manufactured in the same manner as in Example 1, with the exception that thermal treatment was performed at 80° C. for 180 sec, after inkjet printing and before UV curing.

Comparative Example 3

A bezel was manufactured in the same manner as in Example 1, with the exception that thermal treatment was performed at 100° C. for 60 sec, after inkjet printing and before UV curing.

Comparative Example 4

A bezel was manufactured in the same manner as in Example 1, with the exception that thermal treatment was performed at 120° C. for 60 sec, after inkjet printing and before UV curing.

Comparative Example 5

A bezel was manufactured in the same manner as in Example 3, with the exception that the substrate was placed on a hot plate and thermally treated at 100° C. for 5 min, after inkjet printing and before UV curing.

Comparative Example 6

A bezel was manufactured in the same manner as in Example 3, with the exception that the substrate was placed on a hot plate and thermally treated at 100° C. for 7 min, after inkjet printing and before UV curing.

Comparative Example 7

A bezel was manufactured in the same manner as in Example 3, with the exception that the substrate was placed on a hot plate and thermally treated at 120° C. for 3 min, after inkjet printing and before UV curing.

Test Example 1

Evaluation of Cure Shrinkage

The bezel patterns of Examples 1 to 4 and Comparative Examples 1 to 7 were measured for outer appearance including cure shrinkage. The results are shown in Table 1 below.
x: Elimination of cure shrinkage
○: Generation of cure shrinkage

TABLE 1

|  |  | Ex. 1 | Ex. 2 | Ex. 3 | Ex. 4 | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|---|---|---|---|
| Thermal treatment | Oven | ○ | ○ | — | — | ○ | ○ | ○ | ○ | — | — | — |
|  | Hot plate | — | — | ○ | ○ | — | — | — | — | ○ | ○ | ○ |
| Cure shrinkage |  | OK | OK | OK | OK | NG | NG | NG | NG | NG | NG | NG |

Based on the test results, cure shrinkage was eliminated from the bezels of Examples 1 to 4 through thermal treatment before irradiation with UV light, but cure shrinkage occurred in the bezels in Comparative Example 1 to 7. Also, the bezel of Comparative Example 4 exhibited poor printing quality because of ink overflowing due to the high temperature.

Test Example 2

Measurement of Surface Hardness and Adhesion

The bezel patterns of Examples 1 to 4 and Comparative Examples 1 to 7 were measured for surface hardness, adhesion and optical density (OD). The results are shown in Table 2 below.

Surface hardness was measured using a pencil hardness meter under conditions of a scratching angle of 45° and a load of 500 g (standard: ASTM D3363).

Adhesion was measured through cross cut testing and evaluated in the range from 0B to 5B (standard: ASTM D3359).

The optical density was measured through x-rite 341C.

As shown in Table 2, the test results of surface hardness, adhesion and optical density (OD) of the bezel patterns of Examples 1 to 4 is significantly superior compared to those of Comparative Examples 1 to 7. The results were due to the following reasons. As the curing shrinkage was occurred in the bezel pattern of Comparative Examples 1 to 7, the surface hardness and the adhesion were significantly reduced. In addition, as the wrinkle was occurred in the bezel pattern of Comparative Examples 1 to 7, the optical density (OD) was significantly reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a bezel using UV-curable inkjet ink, comprising:
    a) subjecting a substrate to inkjet printing using UV-curable inkjet ink, thus forming a substrate having a bezel, wherein the UV-curable inkjet ink is a UV curable ink composition having a black color, a viscosity of from 1 cP to 20 cP, and includes 10 wt % to 40 wt % of a carbon black pigment, based on the total weight of the UV-curable inkjet ink;
    b) thermally treating the substrate having the bezel in an oven at a temperature of 90 to 110° C. for 120 to 180 sec. or on a hot plate at a temperature of 100 to 120° C. for 5 to 10 min., thus eliminating cure shrinkage; and
    c) irradiating the bezel with UV light, thus forming a cured bezel,
    wherein the cured bezel in c) has a surface hardness of 4H or more and an adhesion of 5B,
    wherein the cured bezel in c) is non-conductive and has a light-shielding property, and
    wherein the cured bezel in c) has an optical density of 4 to 6.

2. The method of claim 1, wherein the cured bezel in c) has a thickness of 2 to 6 μm.

3. The method of claim 1, wherein the UV curable ink composition further comprises an adhesion promoter, a binder solution, a multifunctional monomer, and a photoinitiator.

TABLE 2

|  |  | Ex. 1 | Ex. 2 | Ex. 3 | Ex. 4 | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|---|---|---|---|
| Thermal treatment | Oven | ○ | ○ | — | — | ○ | ○ | ○ | ○ | — | — | — |
|  | Hot Plate | — | — | ○ | ○ | — | — | — | — | ○ | ○ | ○ |
| Surface hardness |  | 5H | 5H | 5H | 5H | 2H | 2H | 2H | 3H | 2H | 2H | 2H |
| Adhesion |  | 5B | 5B | 5B | 5B | 0B | 0B | 0B | 2B | 0B | 0B | 0B |
| OD |  | 5.2 | 5.2 | 5.1 | 5.1 | 2.8 | 2.8 | 2.9 | 3.3 | 2.8 | 2.8 | 2.8 |

4. The method of claim 3, wherein the adhesion promoter is a monomer selected from the group consisting of 2-hydroxyethyl acrylate (2-HEA), hydroxypropyl acrylate (HPA), 2-hydroxyethyl methacrylate (2-HEMA), and hydroxypropyl methacrylate (HPMA).

5. The method of claim 3, wherein the adhesion promoter is 2-hydroxyethyl acrylate (2-HEA).

6. The method of claim 3, wherein the adhesion promoter is present in an amount of from 5 wt % to 25 wt % based on the total weight of the ink composition.

7. The method of claim 3, wherein the binder solution is present in an amount of from 5 wt % to 20 wt % based on the total weight of the ink composition.

8. The method of claim 3, wherein the binder solution comprises an epoxy resin and a second reactive monomer.

9. The method of claim 8, wherein the second reactive monomer is selected from the group consisting of hydroxyethyl acrylate (HEA), hydroxyethyl methacrylate (HEMA), hexanediol diacrylate (HDDA), neopentylglycol hydroxypivalate (HPNDA), tripropyleneglycol diacrylate (TPGDA), and mixtures thereof.

10. The method of claim 8, wherein the epoxy resin to the second reactive monomer are present at a weight ratio of from 20:80 to 30:70, based on the total weight of the ink composition.

11. The method of claim 3, wherein the multifunctional monomer is present in an amount of from 1 wt % to 20 wt % based on the total weight of the ink composition.

12. The method of claim 3, wherein the photoinitiator is present in an amount of from 0.1 wt % to 10 wt % based on the total weight of the ink composition.

13. The method of claim 1, wherein the UV-curable inkjet ink composition has a cure dose of 1 $mJ/cm^2$ to 10,000 $mJ/cm^2$.

14. The method of claim 1, wherein the UV-curable inkjet ink composition absorbs UV light at a wavelength ranging from 360 nm to 410 nm.

15. The method of claim 1, wherein the UV-curable inkjet ink composition comprises from 50 wt % to 65 wt % of a pigment dispersion.

16. The method of claim 15, wherein the pigment dispersion comprises carbon black, a dispersant, and a first reactive monomer.

17. The method of claim 16, wherein the first reactive monomer is 1,6-hexanediol diacrylate, neopentylglycol hydroxypivalate (HPNDA), trimethylolpropane triacrylate (TMPTA), pentaerythritol triacrylate, trimethylenepropane triacrylate, propoxylated glycerol triacrylate, or a mixture thereof.

* * * * *